Figure 1:
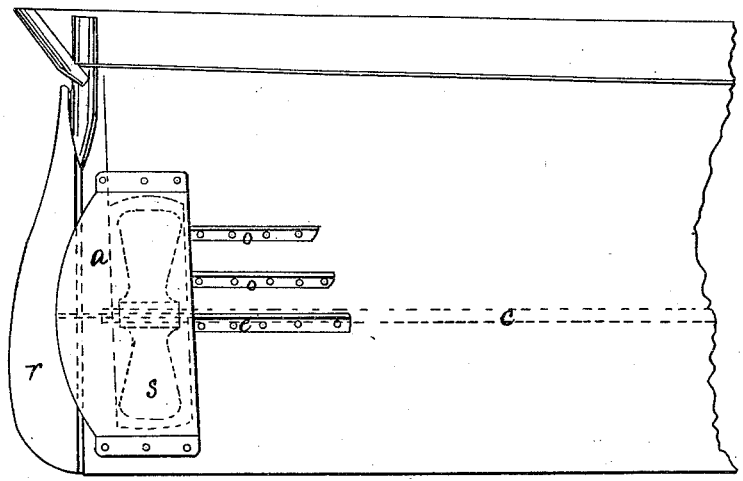
Figure 2:
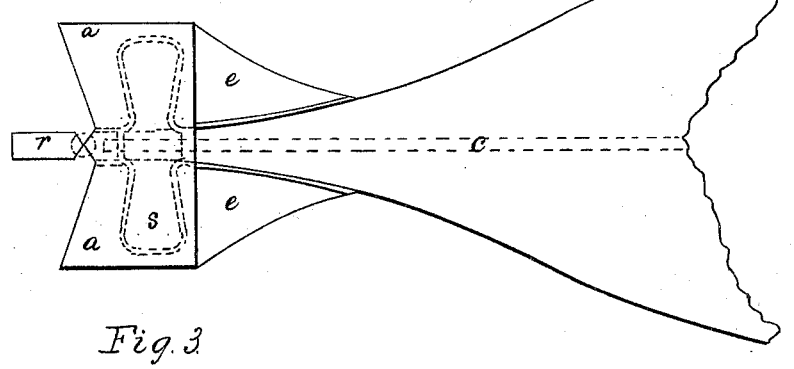
Figure 3:
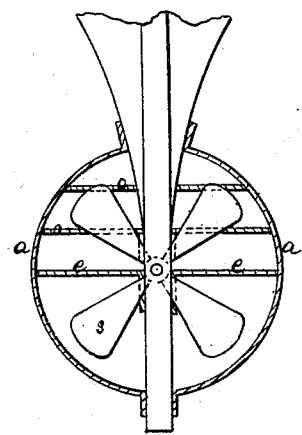

B. F. Bee,
Screw Propeller.

N° 22,525.  Patented Jan. 4, 1859.

UNITED STATES PATENT OFFICE.

BENJAMIN F. BEE, OF HARWICH, MASSACHUSETTS, ASSIGNOR TO HIMSELF, AND JAMES A. WOODBURY, OF BOSTON, MASSACHUSETTS.

SCREW-PROPELLER.

Specification of Letters Patent No. 22,525, dated January 4, 1859.

*To all whom it may concern:*

Be it known that I, BENJAMIN F. BEE, of Harwich, in the county of Barnstable and State of Massachusetts, have invented a new and useful Improvement in Screw-Propellers for Vessels and Boats; and I do hereby declare that the following is a full, clear, and exact description of the construction and operation of the same, reference being had to the annexed drawings, making a part of this specification, in which—

Figure I is a longitudinal elevation of the after part of a vessel with the propeller and improvement attached; Fig. II, a plan view with horizontal section of vessel at the propeller shaft; Fig. III, a transverse elevation showing blades of propeller, &c.

The nature of my invention consists in inclosing the common screw propeller in any of its usual forms, with a metallic cylinder for the prevention of the centrifugal tendency of the water, when the propeller is in operation, the same being combined with metallic plates extending lengthwise through the cylinder, with perforations for the passage of the blades of the propeller, which plates serve to arrest the rotary tendency of the water, thus compelling a comparatively solid column of water to take a course directly opposite to that in which the vessel is to be moved, thereby preventing the loss of power resulting from the oblique or indirect action of the propeller.

To enable others skilled in the art to make and use my invention, I will proceed to describe its construction and the principles of its operation.

It is well known that the method of screw propulsion has many advantages over that of paddle wheels. It is also well known to possess inherent defects, which so far impair its efficiency as to render the securing of its advantages expensive. The loss of power experienced in the use of paddle wheels, resulting from the oblique action of the floats entering and leaving the water, and which we endeavor to avoid by feathering, is greatly increased in the case of the screw, from the fact that its entire action upon the water is necessarily in an oblique direction. The screw propeller working in water is an example of the screw and nut. Now if we turn the screw to produce motion in the direction of the axis and the nut is allowed to turn, no such motion follows. Or, if the threads of the nut expand, and allow the threads of the screw to pass, we also fail of our object. So in the case of the propeller the comparative freedom of the water to revolve with the propeller, and its centrifugal tendency, involves a serious expenditure of power to no useful purpose. To utilize this expenditure is the main object of this invention.

*a, a,* in the several figures are parts of a cylinder of suitable thickness of metal, placed around the screw propeller S. These parts of a cylinder may be bolted or otherwise confined to the hull of the vessel, as shown, and should extend from the forward part of the opening in the run, through which the screw revolves, to as far aft as practicable without interference with the rudder, and should be extended farther at the sides than at the top and bottom, as shown in Figs. I and II.

*e, e* are the plates commencing at any proper distance forward of the propeller, and extending lengthwise through the cylinders, appropriate spaces being made in the plates through which the propeller may freely revolve. These plates should be properly secured to the hull of the vessel, also to the sides of the cylinder, the stern part, &c., and thus the parts mutually brace and support each other. The plates *o, o,* may or may not be used, but will be found useful in partially submerged propellers, for preventing the ingress into the cylinder of floating materials, ice, &c., which might obstruct the propeller.

The cylinders *a, a,* may be of somewhat larger diameter than the screw wheel, and thus the resistance of a larger volume of water be secured. This cylinder serves to restrain the water from its centrifugal tendency, and retains it in a more compact state, and thereby adds to the efficiency of the propeller. This advantage however would be compensated by the increased facility it affords for the rotary motion of the water. But the plates *e, e,* completely obviate this difficulty, and the effect of the combination is that we have a similar result as in the case of any common screw and nut, where the nut is prevented from turning around or expanding—each revolution of the screw producing a corresponding motion in the direction of its axis, either in itself or the nut. Hence the power being expended in forcing the water all in one direction, it necessarily follows that its entire reactive force must be in the opposite direction, or that in which we wish the vessel to proceed.

What I claim therefore as my invention, and desire to secure by Letters Patent is,

The combination of the cylinder $a$, with the longitudinal plates $e$, substantially as described.

BENJAMIN F. BEE.

Witnesses:
 OBEA BROOKS,
 GEORGE H. SNOW.